(12) United States Patent
Lagarde et al.

(10) Patent No.: US 7,134,474 B2
(45) Date of Patent: Nov. 14, 2006

(54) ELASTIC COUPLING DEVICE FOR CONNECTING TWO ROTATING PARTS

(75) Inventors: Eric Lagarde, Sallanches (FR); Didier Maurice Menetrier, Marignier (FR)

(73) Assignee: Somfy SAS, Cluses (FR)

( * ) Notice: Subject to any disclaimer, the term of this patent is extended or adjusted under 35 U.S.C. 154(b) by 110 days.

(21) Appl. No.: 10/490,132

(22) PCT Filed: Sep. 13, 2002

(86) PCT No.: PCT/IB02/03780

§ 371 (c)(1),
(2), (4) Date: Mar. 18, 2004

(87) PCT Pub. No.: WO03/027428

PCT Pub. Date: Apr. 3, 2003

(65) Prior Publication Data

US 2004/0200584 A1 Oct. 14, 2004

(30) Foreign Application Priority Data

Sep. 21, 2001 (FR) .................................. 01 12224

(51) Int. Cl.
*E06B 9/66* (2006.01)
(52) U.S. Cl. ................ 160/296; 160/310; 475/900
(58) Field of Classification Search .............. 464/23, 464/109, 160; 160/66, 296, 310, 904; 475/900; 200/61.39, 61.46
See application file for complete search history.

(56) References Cited

U.S. PATENT DOCUMENTS

| 1,766,823 | A | * | 6/1930 | Jessen ..................... 475/900 |
| 3,289,496 | A | * | 12/1966 | Hoover ..................... 475/900 |
| 4,452,292 | A | | 6/1984 | Leivenzon et al. ......... 160/133 |
| 2003/0000657 | A1 | * | 1/2003 | Dupielet et al. ............ 160/310 |

FOREIGN PATENT DOCUMENTS

| DE | 28 30 360 A | 1/1980 |
| DE | 33 30 645 A1 | 3/1985 |

* cited by examiner

*Primary Examiner*—Greg Binda
(74) *Attorney, Agent, or Firm*—Frommer Lawrence & Haug LLP; Ronald R. Santucci (57) ABSTRACT

The invention concerns an elastic coupling device comprising a first cylindrical part (46), a second cylindrical part (47), at least partly tubular and enclosing the first part with its tubular part and provided with internal teeth (9), at least an elastic means (12) mounted inside the first part in a housing (11) and operating in substantially radial compression, at least a pinion (7) mounted in the first part and meshing with the teeth of the second part to drive a compression means (5) for the elastic means, the compression means consisting advantageously of a clamp. Said construction is particularly compact. Said device combined with rotation detecting means can constitute a torque sensor.

15 Claims, 6 Drawing Sheets

ELASTIC COUPLING DEVICE FOR CONNECTING TWO ROTATING PARTS

BACKGROUND OF THE INVENTION

The subject of the invention is an elastic coupling device for connecting two pieces in rotation.

Such a device is, in particular, for connecting the output of a tubular motor to the winding tube of a roller shutter or the like, for example as provided in document EP-A-0 135 731 for winding an awning. The elastic coupling allows the motor to turn for a few moments longer when the awning reaches the top stop before the stop device reacts. This makes it possible to absorb variations in length of the fabric of the awning and to guarantee a stop position against the stops.

In the roller blind described in document EP-A-0 684 362, an elastic coupling makes it possible to maintain a pressure on a lock, this pressure being necessary for its proper operation.

In the stop device for the roller shutter described in document DE 44 40 449, a clearance wheel is provided, which allows detection of the moment when the shutter encounters an obstacle by means of observation of the rotation of the winding shaft relative to the shaft for entraining the winding shaft. An elastic coupling could be used instead of the clearance wheel.

SUMMARY OF THE INVENTION

The object of the invention is to produce an elastic coupling device that is particularly compact and is capable of deploying a significant elastic force. Its reduced volume must, in particular, allow it to be mounted in the winding tube of a roller shutter.

The elastic coupling device according to the invention is characterized in that it comprises a first cylindrical piece, a second cylindrical piece that is at least partly tubular, surrounds the first piece via its tubular part and is provided with an inner toothset, at least one elastic means mounted inside the first piece in a housing and working in compression substantially radially, at least one pinion mounted in the first piece and meshing with the toothset of the second piece, and a means for compressing the elastic means entrained by the pinion.

The elastic means is preferably a spring that can be perfectly tared.

Such a device lends itself particularly well to being mounted in the tubular motors that entrain the winding tubes of roller shutters or the like.

According to a simple embodiment, the elastic means, in particular a spring, is mounted partially in a housing of the first piece having two ends against which the ends of the elastic means bear, and the compression means consists of a movable U-shaped piece, between the branches of which the elastic means is partially housed in such a manner that a rotation of the second piece has the effect of compressing the elastic means between one of the branches of the U-shaped piece and one of the ends of the housing provided in the first piece.

According to a more developed embodiment, the device comprises two pinions mounted symmetrically relative to the axis of the second piece, and the compression means consists of two facing U-shaped pieces arranged symmetrically relative to the axis of the second piece, the elastic means being mounted between the branches of the U-shaped pieces so as to be housed partly in one of the U-shaped pieces and partly in the other U-shaped piece, these U-shaped pieces being, respectively, entrained approximately radially by each of the pinions.

This embodiment has the advantage of equilibrating the radial forces. It consequently allows a lighter, more compact and, ultimately, less expensive construction.

In a development of one of the preceding embodiments, the device comprises another elastic means, similar to the first elastic means and mounted inside the first piece, and at least one pinion meshing, on the one hand, with the toothset of the second piece and, on the other hand, with the toothset of a means for compressing this other elastic means, and the toothset of the tubular part of the second piece has an interruption facing this at least one pinion such that the other elastic means is compressed only after a certain relative rotation of the pieces.

According to another embodiment, the device comprises a second elastic means arranged transversely to the axis of the second piece and a second pair of pinions that entrain a second pair of U-shaped pieces similar to the first pair of U-shaped pieces for compressing the second elastic means. The toothset of the tubular part has interruptions facing the pinions of the second pair of pinions and the pinions of the second pair are coupled by a central pinion so as to keep the second pair of U-shaped pieces in the center of the tubular part when the device is in the rest position, in which position the pinions of the second pair are totally free and would consequently allow the descent of the U-shaped pieces and of the spring in the absence of the coupling pinion.

Instead of two pairs of pinions and two pairs of U-shaped pieces, it would, of course, be possible to use, twice, a single pinion and a single U-shaped piece, as in the first embodiment.

According to another embodiment, the device comprises a staged pinion between the first piece and the second piece, the stage of larger diameter meshing with the inner, toothset of the second piece and the other stage meshing with the compression means.

To simplify the embodiment, the pinions of the two pairs are advantageously respectively coaxial and the springs constituting the elastic means are parallel.

The coupling device according to the invention also has an interesting application in a device for detecting a torque of predetermined value, in particular for controlling the stopping of a roller shutter or the like when it reaches the end of its travel or when it encounters an obstacle. In such a case, the first piece is fixed and a second piece is, for example, integral with the tubular motor of the roller shutter. The device comprises means for detecting the rotation of the second piece relative to the fixed piece. The dimensions of the fixed part located outside the tubular motor may be reduced to the absolute minimum, which reduces the overall size of the installation compared to solutions that use two external springs, as described in document EP 0 703 344.

The force of the spring can be controlled perfectly, unlike the torsion bar that is used in the device described in document FR-A-2 431 022 (DE 28 30 360), which torsion bar's force, which can be controlled with difficulty, may subject the roller shutter to considerable forces that are likely to damage it.

Embodiments will be described in greater detail in connection with the appended drawing.

BRIEF DESCRIPTION OF THE DRAWINGS

FIG. 1 is a view in diametrical section on II—II of FIG. 2, representing a first embodiment of an elastic coupling between a tubular motor and the winding tube of a roller shutter or the like.

All the figures that follow relate to torque detectors, but the axial-section views may easily be modified, as shown in FIG. 1, to represent an elastic coupling between a motor and winding tube.

DETAILED DESCRIPTION

Figure 1:
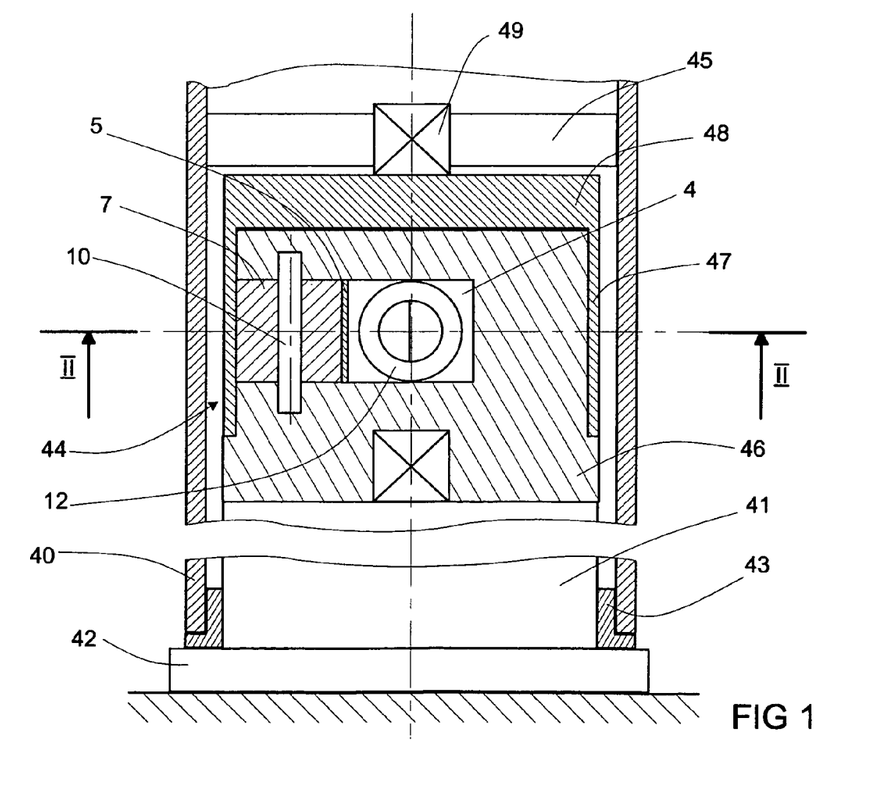

FIG. 1 shows part of a winding tube 40 on which an awning or a roller shutter (not shown) is wound. In a known manner, the winding tube 40 is entrained by a tubular motor 41 mounted in the winding tube 40, coaxially with the latter and the casing of which is fixed to a plate 42 that is itself fixed against a fixed structure, for example a window reveal. The corresponding end of the winding tube 40 is mounted rotatably on the motor 41 by means of a ring 43. The motor 41, more precisely the output of the reduction gear associated with this motor, entrains, by means of an elastic coupling 44, a wheel 45 fixed to the winding tube 40.

Figure 2:
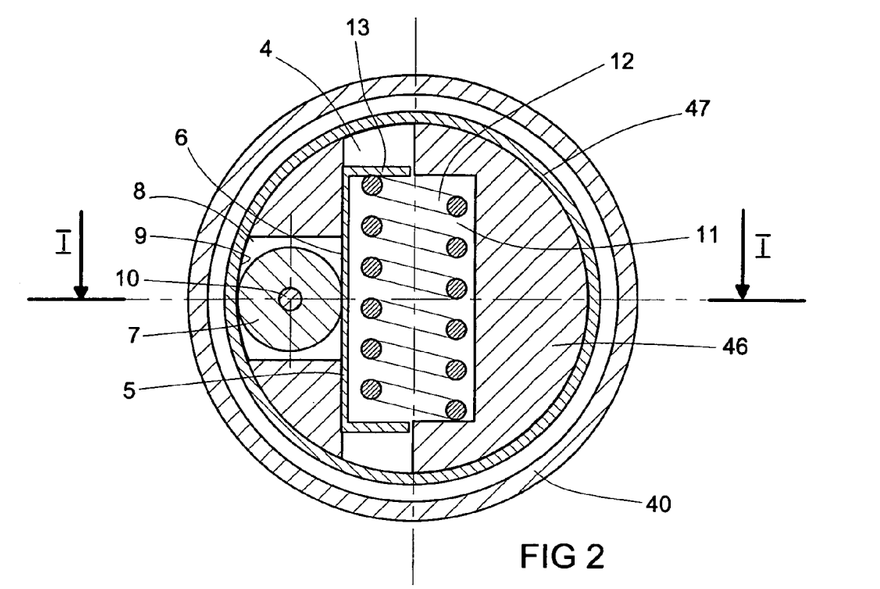
FIG. 2 is a sectional view on I—I of FIG. 1.

The elastic coupling 44 comprises a solid cylindrical body 46 in which is provided a first housing 4 that extends substantially radially through the body 46. This housing 4 contains a U-shaped piece 5 that can slide radially in the housing 4. The outer face of the U-shaped piece 5 has a toothset 6 oriented parallel to the axis of the winding tube. This toothset 6 is in engagement with a pinion 7 mounted in a second housing 8 provided in the body 46 and the axis 10 of which is parallel to the axis of the winding tube. The pinion 7 also meshes with a toothset 9 formed on the inner wall of a tube 47 coaxial with the winding tube and integral with a disk 48 provided with a square 49 via which it entrains the wheel 45. The body 46 has a third housing 11 that extends substantially radially over only a portion of the diameter of the body 46. This housing 11 partially accommodates a spring 12. The axial half of the spring 12 is located in the housing 11, its other half being accommodated between the branches 13 and 14 of the U-shaped piece 5.

The coupling is shown in the rest position, i.e. in the absence of a torque sufficient to compress the spring 12. When the winding tube 40 is held, for example at the end of winding of the roller shutter, the relative rotation between the tube 47 and the motor 41 has the effect of entraining the pinion 7 and thereby the U-shaped piece 5. The spring 12 is then compressed between one of the branches of the U-shaped piece and the opposing end of the housing 11.

Figure 3:
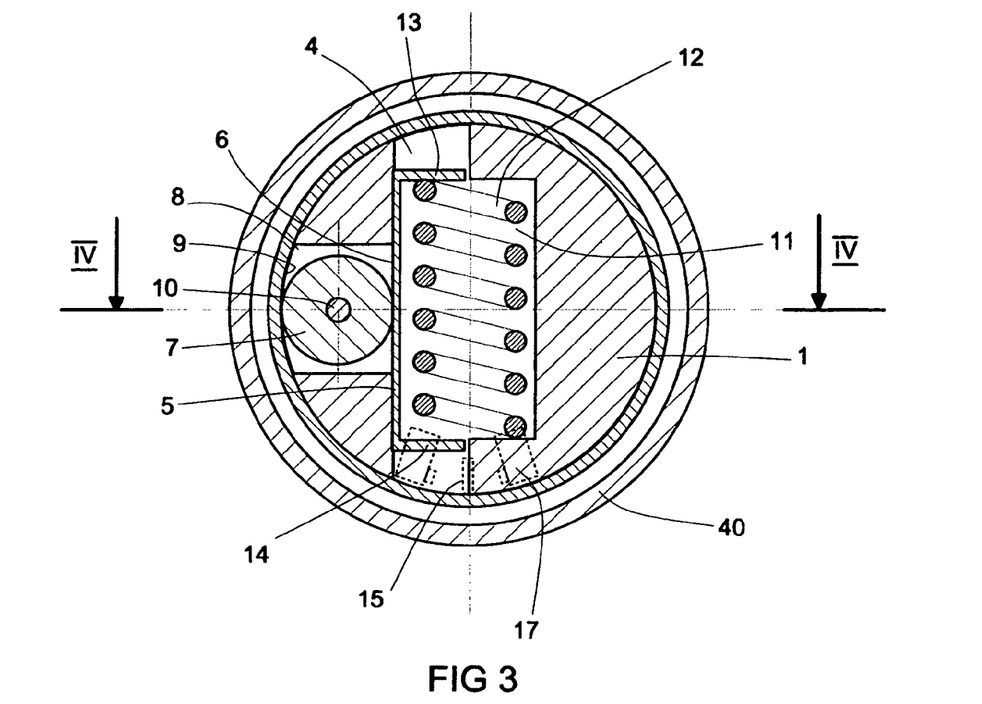
FIG. 3 is a sectional view on III—III of FIG. 4 of the first embodiment used in a torque-detector device.
Figure 4:
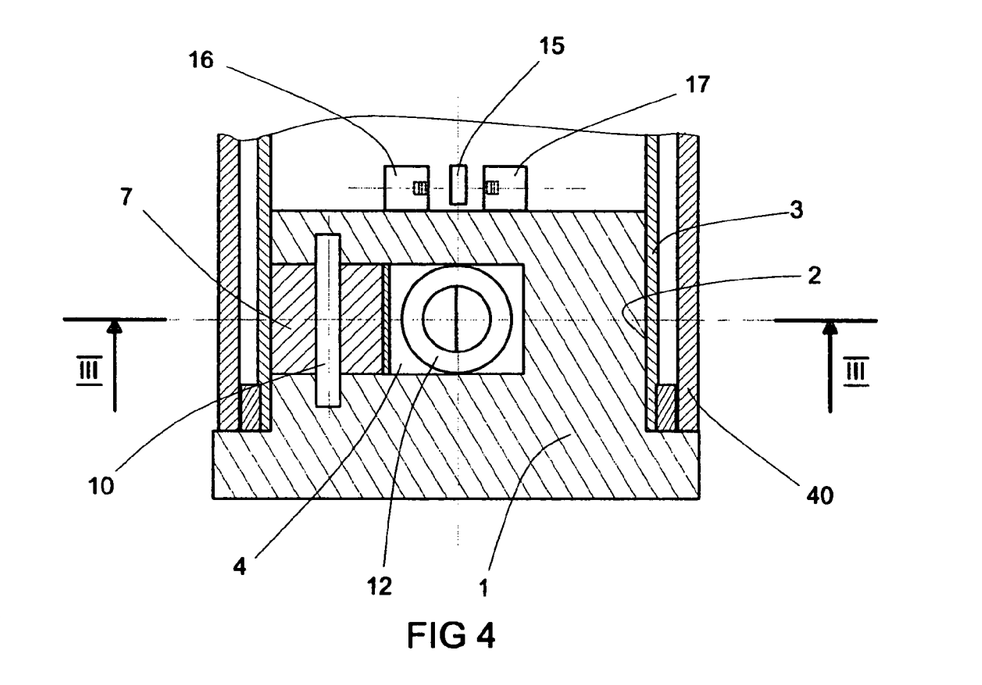
FIG. 4 is a sectional view on IV—IV of FIG. 3.

The following figures show torque-detection devices, but, as will become immediately apparent from the description of FIGS. 3 and 4, the structure of the torque detector is essentially identical to that of the elastic coupling, such that the embodiments shown in FIGS. 3 to 12 may easily be adapted in order to form elastic couplings. In order to highlight this identity properly, the components of the elastic coupling that are shown in FIGS. 1 and 2, and that appear again in the subsequent figures, have been denoted by the same reference numbers.

In FIGS. 3 and 4, a fixed support 1 (corresponding to the support 42 of FIG. 1) has a cylindrical bearing surface 2 on which is rotatably mounted a tube 3, for example the extension of the casing of a tubular motor similar to the motor 41. Around the tube 3 there is the winding tube 40 of a roller shutter mounted rotatably on the fixed support 1. In the fixed support 1 there is the first housing 4 extending substantially radially through the support, as in the coupling described above. The U-shaped piece 5 is mounted in this housing and can slide radially in the housing 4. As previously, the outer face of the U-shaped piece 5 has a toothset 6 oriented parallel to the axis of the tube 3. This toothset is in engagement with a pinion 7 mounted in a second housing 8 provided in the fixed support 1 and the axis 10 of which is parallel to the axis of the tube 3. The pinion 7 meshes, moreover, with a toothset 9 formed on the inner wall of the tube 3. The fixed support 1 has a third housing 11 extending substantially radially relative to the axis of the tube over only a portion of the diameter of the bearing surface 2 of the fixed support and open on the housing 4 side. This housing 11 partially accommodates a spring 12 that is slightly prestressed so as to bear on the ends of the housing 11. The axial half of the spring 12 is located in the housing 11, its other half being accommodated between the branches 13 and 14 of the U-shaped piece 5.

The tube 3 is provided with a radial finger 15 directed towards the inside and engaged between two switches 16 and 17 fixed on a radial face of the fixed support 1 so as to be actuated alternately by the finger 15 when the tube 3 turns in one direction or in the other direction.

These switches control, for example, the stopping of the motor.

The device is shown in the rest position, that is to say in the absence of a torque sufficient to compress the spring 12. If sufficient torque is exerted on the tube 3, the latter is entrained in rotation, which has the effect of entraining the pinion and thereby the U-shaped piece 5. The spring 12 is then compressed between one of the branches of the U-shaped piece and the opposing end of the housing 11. After rotation of the tube 3 through a certain angle, the finger 15 actuates one of the switches.

The means for detecting rotation are, in this instance, symmetrical. The finger 15 and/or the switches 16 and 17 could, however, be arranged asymmetrically so that the travel of the finger 15, before it actuates a switch, is different for each of the two switches. This would enable different torques to be detected in one direction and in the other direction of rotation.

In an application to roller shutters or the like, the torques detected are torques developed by the roller shutter's arriving at the top and bottom stops.

Figure 5:
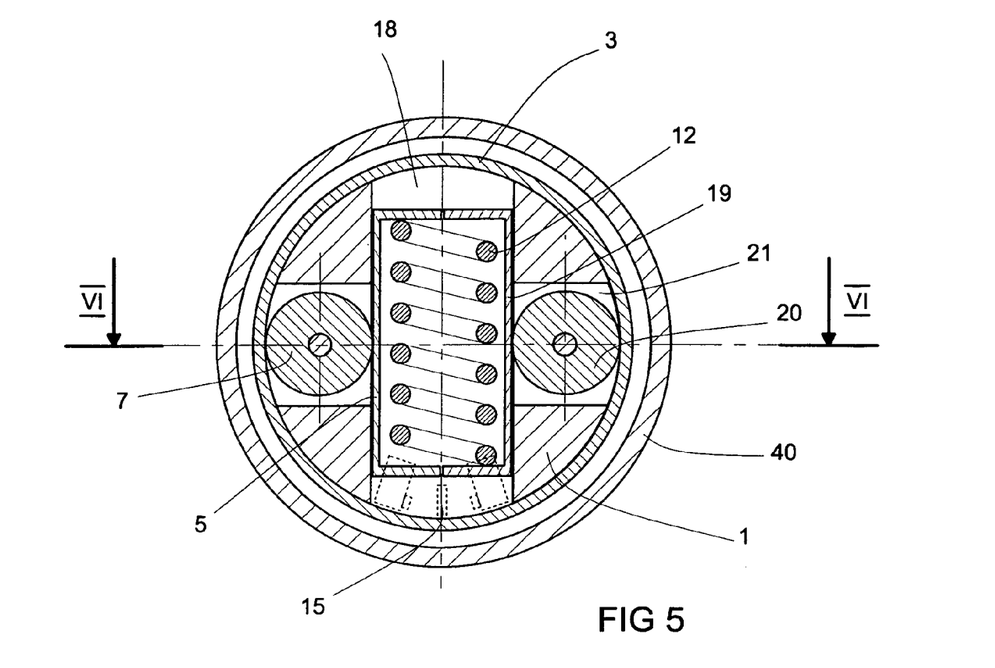
FIG. 5 is a sectional view on V—V of FIG. 6 of a second embodiment.
Figure 6:
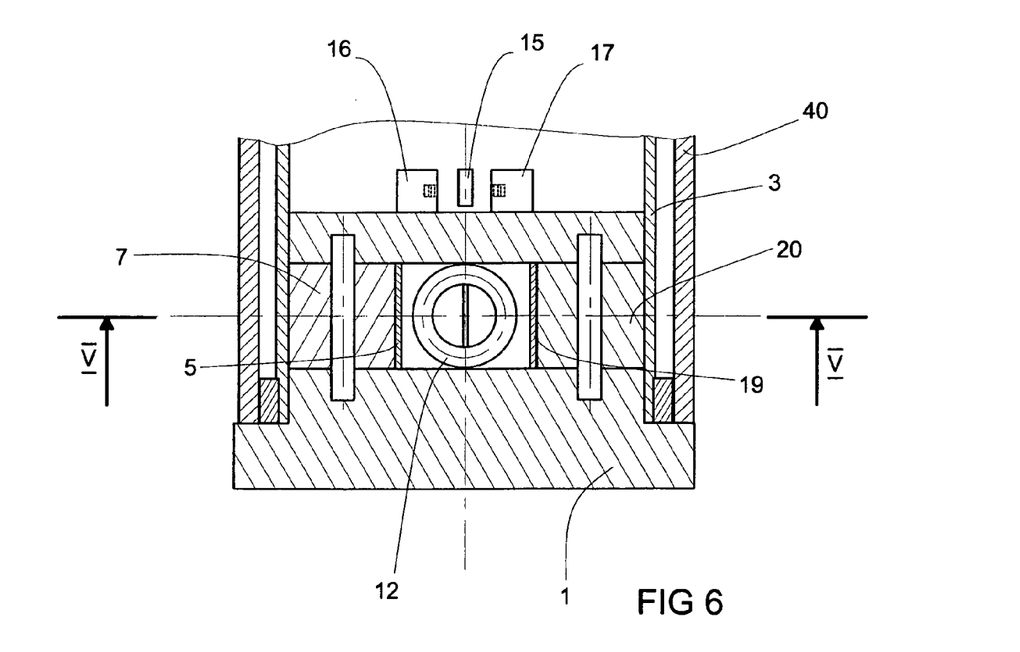
FIG. 6 is a sectional view on VI—VI of FIG. 5.

The second embodiment, shown in FIGS. 5 and 6, differs from the second embodiment in that the housings 4 and 11 are replaced by a single housing 18 that extends diametrically through the fixed support 1 and in that provision is made for a second U-shaped piece 19, identical to the U-shaped piece 5, arranged symmetrically to the U-shaped piece 5 relative to the axis of the tube 3, the spring 12 being housed half in one of the U-shaped pieces and half in the other U-shaped piece. The toothset of the second U-shaped piece 19 is engagement with a second pinion 20 with an axis parallel to the first pinion 7, mounted in a housing 21 of the support and in engagement with an internal toothset of the tube 3. When the tube rotates, the U-shaped pieces move in opposite directions in a balanced manner. This embodiment has the advantage of equilibrating the radial forces and consequently of stressing the structure less, which makes it possible to achieve a lighter, more compact and less expensive construction.

Figure 7:
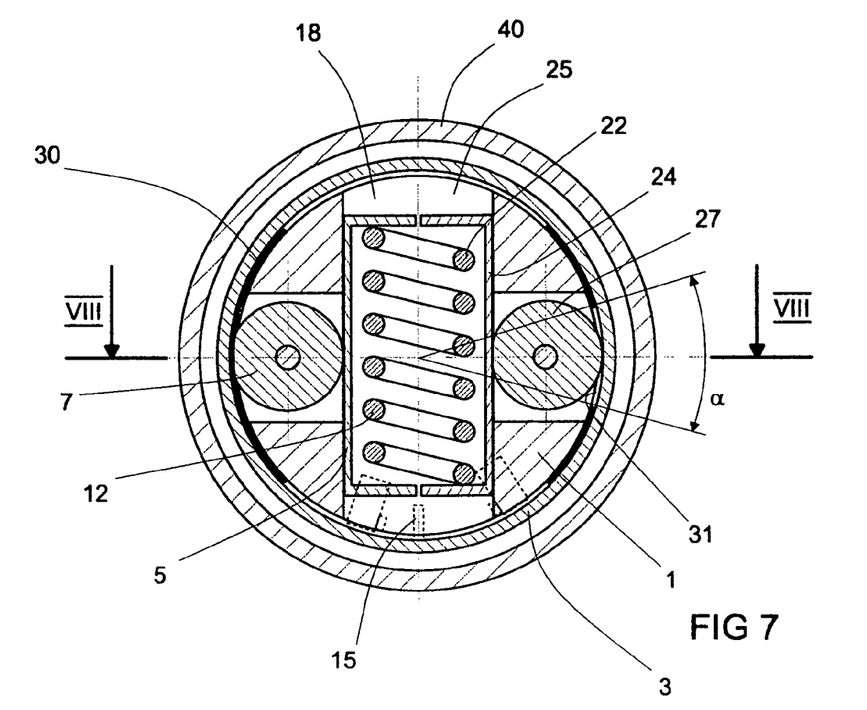
FIG. 7 is a sectional view on VII—VII of FIG. 8 of a third embodiment.
Figure 8:
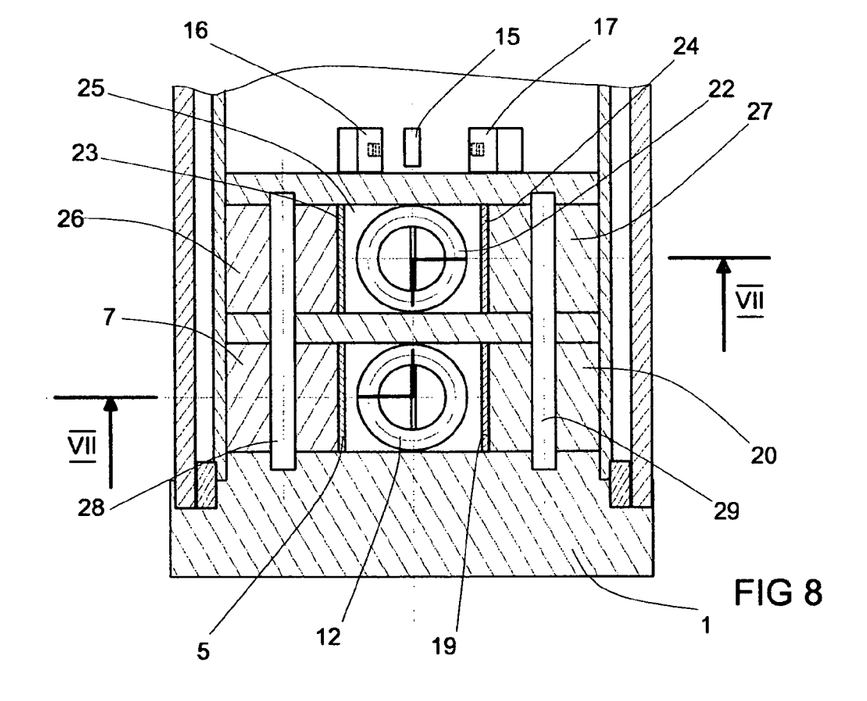
FIG. 8 is a sectional view on VIII—VIII of FIG. 7.

The embodiment shown in FIGS. 7 and 8 differs from the preceding embodiment in that it includes a second spring 22 arranged radially in the tube 3, parallel to the spring 12 and accommodated in a second pair of U-shaped pieces 23, 24 identical and parallel to the first pair of U-shaped pieces and mounted slideably in a second housing 25 of the fixed support 1. Just like the U-shaped pieces 5 and 19, the U-shaped pieces 23 and 24 are in engagement with pinions 26 and 27 mounted respectively coaxially with the pinions 7 and 20 on common axes 28 and 29. Whereas the toothset 30 of the tube 3 is continuous over a certain arc, facing the pinions 7 and 20, this toothset has an interruption 31 extending over an arc α facing each of the pinions 26 and 27, in the rest position of the devices. In this rest position, the switch 16 is furthermore closer to the actuating finger 15 than is the switch 17.

This embodiment makes it possible to detect torques that are substantially different for each direction of rotation. For a first rotation of the tube 3 through an angle approximately equal to α/2, only the pinions 7 and 20 are entrained and only the spring 12 is compressed. If this rotation corresponds to the distance between the finger 15 and the switch 16, the torque detected will correspond to the compression of only the spring 12. If, on the other hand, the tube 3 is entrained in the other direction, the distance between the finger 15 and the switch 17 will allow the toothset of the tube 3 also to come into engagement with the pinions 26 and 27, which will also give rise to the compression of the second spring 22, the force of which will be added to that of the spring 12. The torque detected will thus be substantially greater. In the case of an application to the entrainment of a roller shutter, the smaller torque will correspond to the bottom stop and the greater torque to the arrival at the top stop.

Applied to a motorized roller shutter, this construction also has the advantage of being symmetrical, i.e. enabling it to be positioned to the left or to the right of a reveal.

Figure 9:
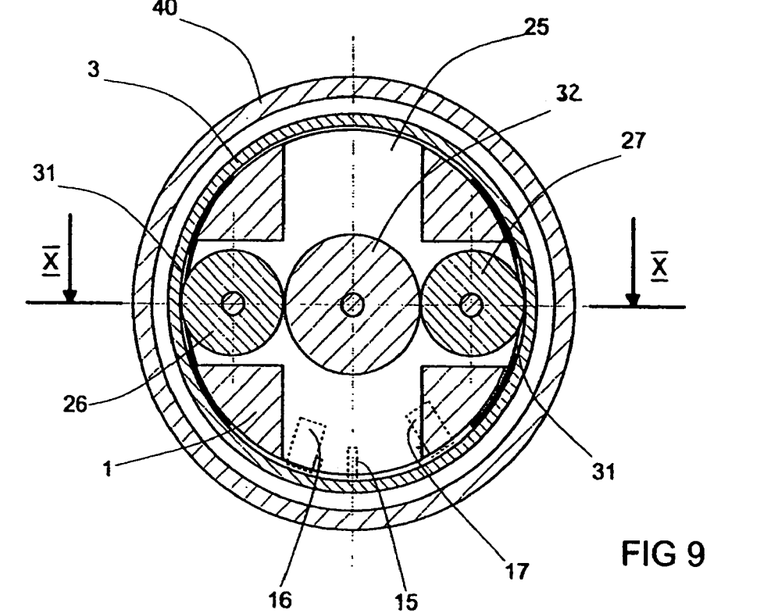
FIG. 9 is a sectional view on IX—IX of FIG. 10, showing an improvement of the third embodiment.
Figure 10:
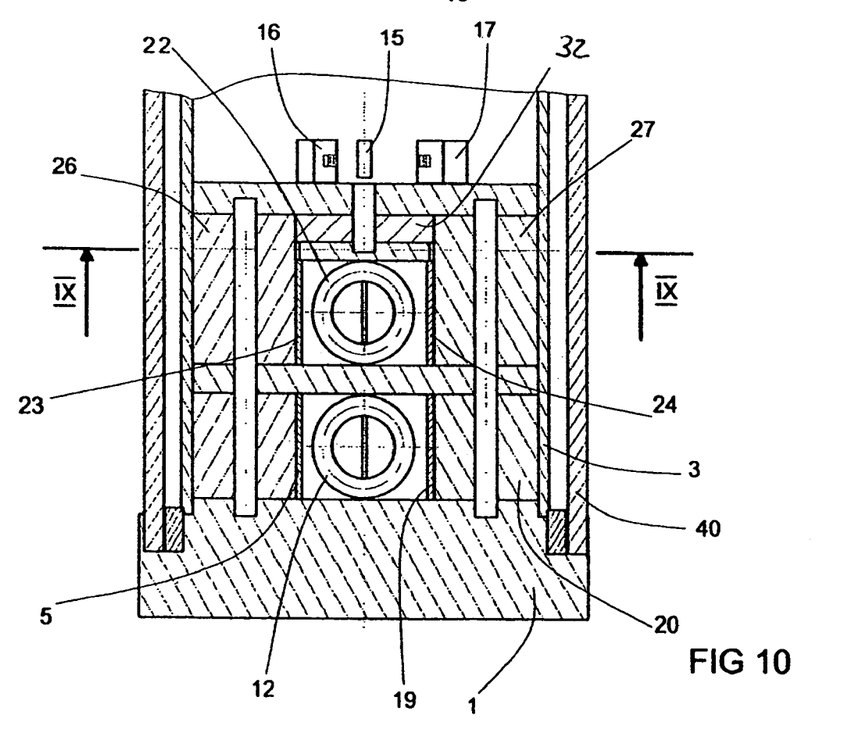
FIG. 10 is a sectional view on X—X of FIG. 9.

In the embodiment, it will be noted that, in the reset position, in vertical position of the spring 22, the weight of the spring and of the U-shaped pieces 23 and 24 will tend to entrain this assembly that is not held in by the pinions 26 and 27, the latter not being in engagement with the toothset of the tube 3. To avoid the drawback, it suffices to mount a central pinion 32 meshing with the two pinions 26 and 27, as shown in FIGS. 9 and 10.

Figure 11:
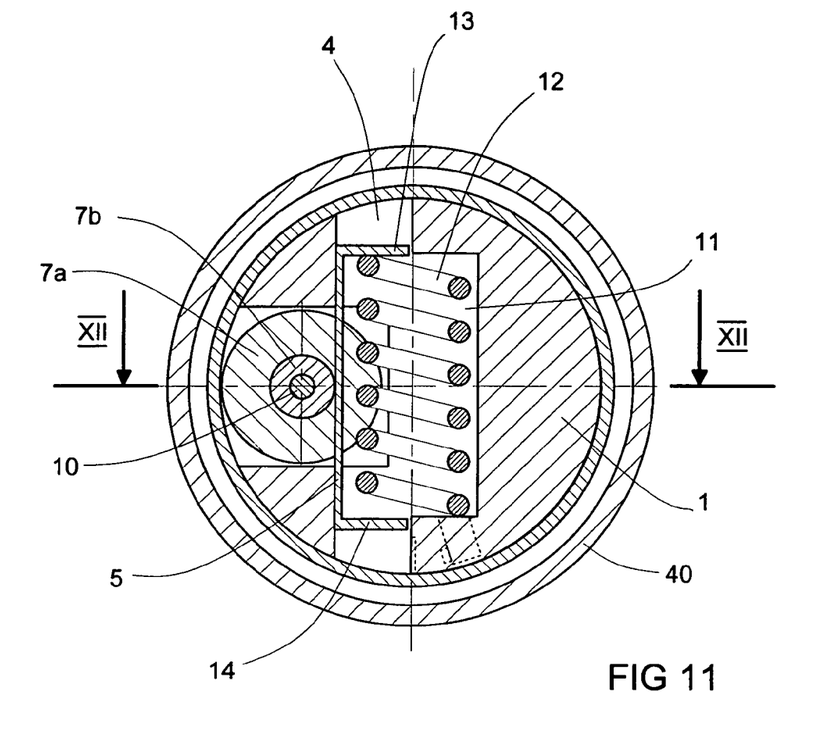
FIG. 11 is a sectional view on XI—XI of a fourth embodiment.
Figure 12:
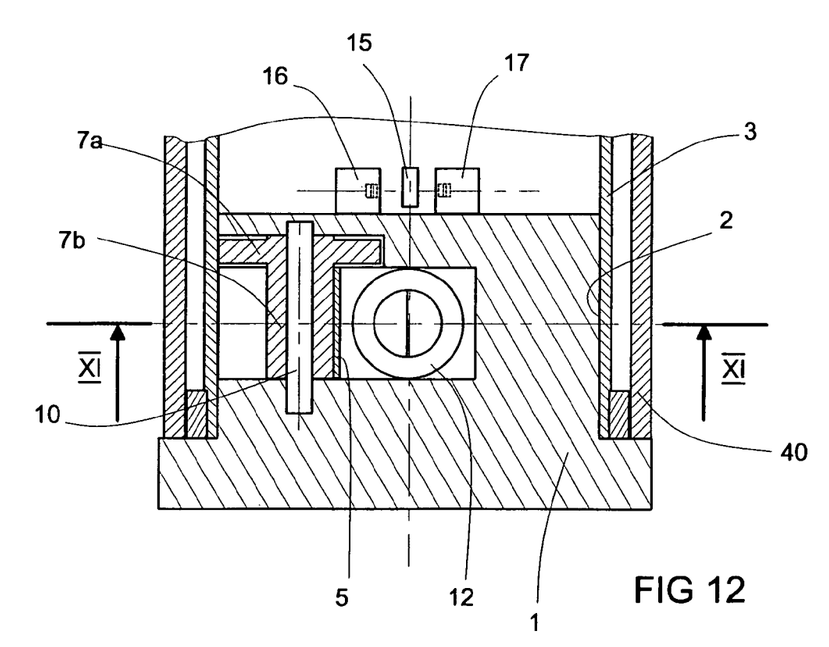
FIG. 12 is a sectional view on XII—XII of FIG. 11.

In the embodiment shown in FIGS. 11 and 12, the pinion 7 has been replaced by a staged pinion 7a, 7b, the stage 7a of larger diameter meshing with the toothset of the tube 3 and the stage 7b meshing with the U-shaped piece 5. The reduction effect thereby obtained makes it possible to obtain a greater angular displacement in elastic phase, which makes it possible, within the context of use as an elastic coupling, to absorb a larger variation in length of the awning, particularly in the case of awnings in which a long length of fabric is deployed and, within the context of use as a stop-torque detector in a motor, more precise and easier detection of the predetermined torque.

In embodiments with two springs, the second spring could be different from the first spring and arranged differently.

The detection means could be arranged outside the tubular part.

The invention claimed is:

1. An elastic coupling device for connecting two pieces in rotation, comprising:
   a first cylindrical piece (46; 1),
   a second cylindrical piece (47; 3) that is at least partly tubular, surrounds the first piece via its tubular part and is provided with an inner toothset (9),
   at least one elastic means (12; 22) mounted inside the first piece (46; 1) in a housing (11) and working in compression substantially radially,
   at least one pinion (7; 20, 26, 27; 7a, 7b) mounted in the first piece and meshing with the toothset of the second piece, and
   a means (5; 19; 23; 24) for compressing the at least one elastic means, the means for compressing being entrained by the at least one pinion.

2. The device, as claimed in claim 1, wherein the elastic means (12) is mounted partially in a housing (11) of the first cylindrical piece having two ends against which the ends of the elastic means bear, and wherein the compression means consists of a movable U-shaped piece (5), between the branches of which the elastic means is partially housed in such a manner that a rotation of the second piece (3) has the effect of compressing the elastic means between one of the branches of the U-shaped piece and one of the ends of the housing provided in the first piece (1).

3. A device for detecting a torque of predetermined value, using the elastic coupling device as claimed in claim 2, wherein the first piece (1) is fixed and comprises means (15, 16, 17) for detecting the rotation of the second piece (3) relative to the fixed piece (1).

4. The device as claimed in claim 1, which comprises two pinions (7, 20) mounted symmetrically relative to the axis of the second piece (3), and wherein the compression means consists of two facing U-shaped pieces (5, 19) arranged symmetrically relative to the axis of the second piece, the elastic means being mounted between the branches of the U-shaped pieces so as to be housed partly in one of the U-shaped pieces and partly in the other U-shaped piece, these U-shaped pieces being, respectively, entrained approximately radially by each of the pinions.

5. The device as claimed in claim 4, which comprises a second elastic means (22) arranged transversely to the axis of the second piece (3), and a second pair of pinions (26, 27) entraining a second pair of U-shaped pieces (23, 24), similar to the first pair of U-shaped pieces, for compressing the second elastic means, wherein the toothset of the tubular part has interruptions (31) facing the pinions of the second pair of pinions, and wherein the pinions (26, 27) of the second pair are coupled by a central pinion (30).

6. A device for detecting a torque of predetermined value, using the elastic coupling device as claimed in claim 5, wherein the first piece (1) is fixed and comprises means (15, 16, 17) for detecting the rotation of the second piece (3) relative to the fixed piece (1).

7. A device for detecting a torque of predetermined value, using the elastic coupling device as claimed in claim 4, wherein the first piece (1) is fixed and comprises means (15, 16, 17) for detecting the rotation of the second piece (3) relative to the fixed piece (1).

8. The device as claimed in claim 1 which comprises another elastic means (22), similar to the first elastic means and mounted inside the first piece (1), and at least one pinion (26, 27) meshing, on the one hand, with the toothset of the second piece (3) and, on the other hand, with the toothset of a means (23, 24) for compressing this other elastic means (22), and wherein the toothset of the tubular part of the second piece has an interruption (31) facing this at least one pinion.

9. A device for detecting a torque of predetermined value, using the elastic coupling device as claimed in claim 8, wherein the first piece (1) is fixed and comprises means (15, 16, 17) for detecting the rotation of the second piece (3) relative to the fixed piece (1).

10. The device as claimed in claim 1, characterized- in that it which comprises a staged pinion (7a, 7b) between the first piece (1) and the second piece (3), the stage (7a) of larger diameter meshing with the inner toothset of the second piece (3) and the other stage (7b) meshing with the compression means (5).

11. A device for detecting a torque of predetermined value, using the elastic coupling device as claimed in claim 10, wherein the first piece (1) is fixed and comprises means (15, 16, 17) for detecting the rotation of the second piece (3) relative to the fixed piece (1).

12. A device for detecting a torque of predetermined value, using the elastic coupling device as claimed in claim 1, wherein the first piece (1) is fixed and comprises means (15, 16, 17) for detecting the rotation of the second piece (3) relative to the fixed piece (1).

13. The detection device as claimed in claim 12, characterized in that the means for detecting the rotation consist of a finger (15) and a pair of switches (16, 17).

14. A roller shutter including the elastic coupling device of claim 1.

15. An awning including the elastic coupling device of claim 1.

* * * * *